Figure 1:
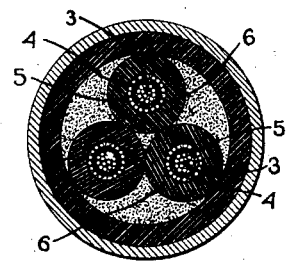

W. H. COLE.
DIVIDED CONDUCTOR FOR ELECTRICAL DISTRIBUTING SYSTEMS.
APPLICATION FILED DEC. 3, 1914.

1,177,993.

Patented Apr. 4, 1916.

Witnesses.
J. Morrill Fuller
William C. Gagen

Inventor.
William H. Cole
by Heard Smith & Tennant.
Att'ys

UNITED STATES PATENT OFFICE.

WILLIAM H. COLE, OF WALTHAM, MASSACHUSETTS.

DIVIDED CONDUCTOR FOR ELECTRICAL DISTRIBUTING SYSTEMS.

1,177,993.  Specification of Letters Patent.  Patented Apr. 4, 1916.

Application filed December 3, 1914. Serial No. 875,373.

*To all whom it may concern:*

Be it known that I, WILLIAM H. COLE, a citizen of the United States, residing at Waltham, county of Middlesex, State of Massachusetts, have invented an Improvement in Divided Conductors for Electrical Distributing Systems, of which the following description, in connection with the accompanying drawing, is a specification, like characters on the drawing representing like parts.

This invention relates to conductors for electrical distributing systems of that type which might be termed "divided conductors", by which expression I mean a conductor or cable having extending longitudinally thereof a plurality of conductor members or leads which are insulated from each other. It has been heretofore proposed to employ divided conductors of this construction in electrical-distributing systems with the conductor members or leads of each conductor connected in parallel and when this construction is used the various conductor members will normally carry current of substantially the same voltage unless some means be employed to create a difference of potential between them for some special purposes. Where a divided conductor is thus used an insulation of low value is sufficient to insulate the members of any conductor from each other so long as normal conditions exist in the electrical-distributing system because, since the conductor members are connected in parallel, they will under normal conditions carry substantially the same voltage or at least the difference of voltage between the conductor members will remain within fixed limits.

When divided conductors as above described are used in an electrical-distributing system which has automatic disconnective devices for cutting out the conductor when a fault occurs, which disconnective devices are of that type that are normally held in balance or inoperative by the normal current conditions, it has been thought necessary to make the separator insulation between the members of a divided conductor not only of sufficient dielectric strength to withstand any normal potential difference which exists between the conductor members, but of sufficient additional dielectric strength to withstand the potential difference due to the presence of a fault in one of the conductor members. The reason for this has been because if the separator insulation was only of sufficient dielectric strength to withstand the normal potential difference existing between the conductor members, the abnormal difference of potential which might exist between the conductor members due to the occurrence of a fault involving one of the conductor members would be likely to cause the separator insulation to break down at the point of fault, or at some other point, either on account of the heat and burning due to arcing at the point of fault or on account of the abnormal potential difference caused by the fault. This breaking down of the separator insulation would establish an electrical connection between the conductor members, thus tending to equalize the potential in them which would prevent the unbalanced current conditions in the conductors necessary to operate the disconnective devices. The manufacture of divided conductors for use in an electrical-distributing system having disconnective devices and where the two conductor members are connected in parallel, has, therefore, necessitated the use of separator insulation having a considerably greater dielectric strength than is necessary to merely withstand the normal potential difference between said conductor members.

In my co-pending application Se. No. 798,594, filed October 31, 1913, I have illustrated and described an electrical-distributing system involving a divided conductor and disconnective means for disconnecting the connector from the system when a fault occurs in said conductor wherein the failure of the separator insulation between the conductor members due to a fault involving one of said members does not render the disconnective device inoperative, but, on the other hand, will cause it to operate. A divided conductor operating in a system of this nature does not require a separator insulation between the conductor members of sufficient dielectric strength to withstand potential difference due to initial faults, as the break down of such separator insulation does not render the system inoperative.

The present invention has for its object to provide a novel form of divided conductor in which the separator insulation as a whole need only be commensurate with the operating voltage required between the conductor members, and which is intentionally made weaker or of reduced value at predetermined points along the conductor, and which preferably will be of such a nature and thickness as to be readily weakened dielectrically by the heat due to arcing at a fault. A divided conductor of this nature has special utility in a system of electrical distribution involving a selective disconnecting means such as shown in my said copending application Se. No. 798,594, for when used in such a system any break down of the separator insulation due to a fault initially affecting one conductor member only will occur either at the point of the main fault or at the predetermined weak points along the conductor or cable, which weak points will be intentionally located at readily accessible places so that repairs may be conveniently made. The advantage I gain by the use of a conductor of this nature is that since the separator insulation need only be commensurate with the operating voltage required between the conductor members, the expense of manufacture is considerably reduced.

In order to give a better understanding of my invention, I have illustrated in the drawings a selected embodiment thereof which will now be described.

Figure 4:
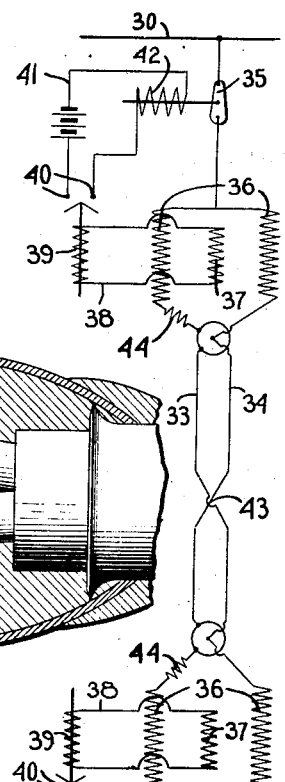
Figure 2:
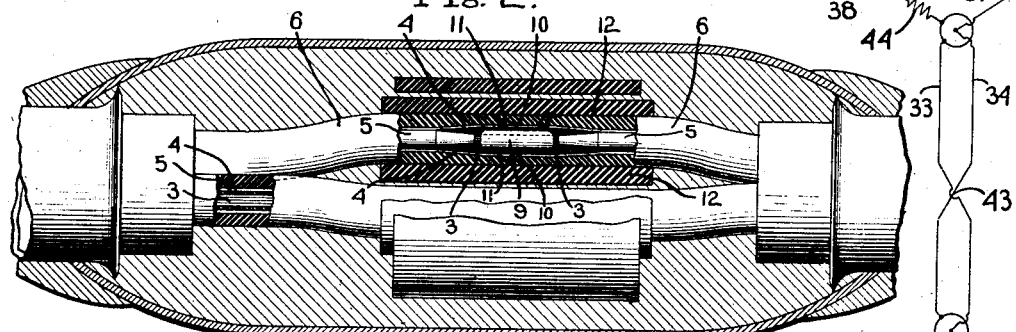
Figure 3:
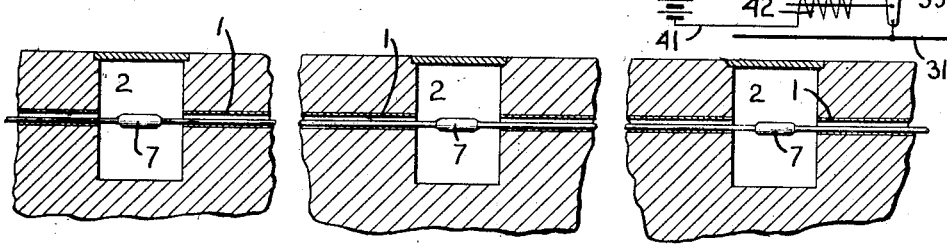

Figure 1 is a cross sectional view of a three-conductor cable embodying my invention; Fig. 2 is a partial sectional view through the joint connecting different sections of the cable; Fig. 3 is a more or less diagrammatic view showing a cable embodying my invention laid in an underground conduit. Fig. 4 is a diagrammatic view showing the application of my improved conductor in an electrical-distributing system, such as illustrated in my said co-pending application Se. No. 798,594.

Fig. 1 shows a cable for a three-phase system having a divided conductor for each phase. Each divided conductor comprises the two conductor members 3 and 4 which are separated by insulation 5. These two conductor members are shown as arranged concentrically, that is, the member 3 is situated within the member 4, and the two members are inclosed in insulation 6. These two conductor members 3 and 4 are intended to be connected in parallel so that under normal conditions they will carry current of substantially the same potential. There will, therefore, be comparatively little, if any, difference of potential between the conductor members 3 and 4 when the conductor is in normal operation. A divided conductor of this nature may be used singly or may be made in the form of a multi-conductor cable, such as a three-conductor-cable, as shown in Fig. 1.

In Fig. 4 I have shown in diagram a divided conductor in an electrical-distributing system, such as shown in my said co-pending application Se. No. 798,594. 30 and 31 designate two receiving or distributing buses or mains which are connected by a divided conductor, the two conductor members of which are shown at 33 and 34, respectively. These two conductor members are connected in parallel and are connected at each end to the buses 30 or 31 through a switch device 35. This switch is arranged to be actuated to disconnect the conductor from the mains whenever a fault occurs involving either or both conductors and the disconnective device herein shown comprises a primary winding 36 in each conductor member at each end thereof and a common secondary 37 coöperating with the two primaries at each end, each secondary 37 being in a circuit 38 having a trip coil 39 therein which when energized closes contacts 40 in a circuit 41 connected to a switch-operating magnet 42 by which the switch 35 is operated. The two conductor members 33 and 34 are shown as transposed at a point in the length of the conductor, as shown at 43, so that the current path through the conductor is partly in the inner and partly in the outer conductor member. A reactance 44 is placed in each current path, one reactance being situated at one end of the conductor and the other at the other end of the conductor so that under normal conditions a difference of potential will exist between the conductor members throughout the length of the conductors. With this arrangement the transformers at each end of the conductor will be held in balance under normal working conditions, but if a fault occurs involving either a single conductor member or both of the conductor members, the current flowing through the transformers will be unbalanced and the disconnective devices will be operated. It will be noted that with this arrangement any break down of the insulation between the conductor members 33 and 34 will cause the disconnective device to be operated because such break down of insulation will result in current flowing from the conductor member having a higher potential to that having a lower potential and thus in unbalancing the transformers.

It has heretofore been thought that in order to successfully use a divided conductor of this nature in an electrical-distributing system having conductor-disconnective devices that are normally held in balance or inoperative by balancing the current in one conductor member against that in the other, it was necessary to make the conductor with the separator insulation between the conductor members not only of sufficient dielectric strength to withstand the normal operating potential difference between the conductor members, but also of sufficient added dielectric strength to withstand any momentary potential difference that might exist should leakage from either conductor member to the earth or to another lead occur, as above described. Where a divided conductor is used in connection with the disconnective devices shown in Fig. 4 it is not necessary for the practical working of the system to provide such conductor with the separator insulation having the added dielectric strength above referred to over and above that necessary to withstand the normal operating voltage between the conductor members because in the device shown in Fig. 4 the disconnective devices will operate to disconnect the conductors from the system whenever the separator insulation between the conductor members breaks down at any point sufficiently to permit current to flow from one conductor member to the other. If, however, a divided conductor were used in an electrical-distributing system disclosed in Fig. 4, which conductor had separator insulation merely of sufficient dielectric strength to withstand the normal operating potential difference existing between the conductor members and a fault should occur involving either conductor member which caused an increase of potential difference between the conductor members, such increase of potential difference would tend to break down the insulation between the conductor members either at the point of fault or at some other point. It is, of course, desirable that in case the separator insulation is thus broken down at any point other than the point of fault, such other point shall be in an accessible location where repairs can be easily made, and my improved conductor is so constructed as to provide for this contingency and to assure that if the separator insulation does break at some point other than the point of fault it will be at predetermined locations. I secure this end by making the separator insulation of a strength throughout its length commensurate with the normal operating potential difference between the conductor members and also provide it with weakened places at predetermined points, so that whenever there is a tendency for such separator insulation to become ruptured upon the occurrence of a fault at a point other than the point of fault, such rupture will occur at the predetermined weakened points. These predetermined weakened places in the insulation may be located at any desired point along the length of the conductor. In actual practice it will probably be found most convenient to locate such places at the joints where different sections of the conductors are connected, for these joints are usually situated in some accessible position.

In the manufacture and installation of conductors for electrical-distributing systems of considerable length, it is customary to make and lay the conductors in sections and to connect the sections together by a suitable joint which is usually in some accessible position. If, for instance, the cable or conductor is an underground conductor, as shown in Fig. 3, it would be laid in the conduit 1 and the joints 7 between the conductor sections are generally formed in a manhole 2. In the practical embodiment of my invention I propose to make the points where the insulation between the members 3 and 4 of each conductor is weakest at the joint 7, and this can be readily done when the joint is made by placing at the joint between the conductor members 3 and 4 insulation of less thickness and less value than exists between said members in the body of the conductor. I have shown in Fig. 2 a typical joint connecting the conductors. The two meeting ends of the conductor members 3 of two adjacent conductor sections are soldered or otherwise connected together, as shown at 9, and the meeting ends of the outer conductor members 4 are also connected or soldered together, as shown at 10. In making this joint the conductor member 4 and the insulation 5 are stripped back at the end of the conductor members and the two members 3 are soldered or joined together, as at 9, after which suitable insulation 11 is placed about the joint and the ends of the conductor member 4 are brought together and connected, the joint thus made being inclosed in exterior insulation 12 of suitable thickness. In making this joint the insulation 11 is purposely made so as to have less insulating value than the insulation 5 between the conductor members 3 and 4 in the body of the conductor so that when the conductor is completed the insulation between the conductor members 3 and 4 will be weakest at the points 11. The advantage of this construction is that if during the development of a fault a pressure or potential is developed between the conductor members 3 and 4 which is sufficient to puncture or destroy the insulation 5, this pressure will, unless the heating of the separator insulation at the place of the fault causes puncture at that point, cause the insulation to give way at the weaker point 11 which is at the joint where it can be readily repaired instead of at some indeterminate point between the ends of the conductor sections. If the insulation should give way at some indeterminate point this would necessitate pulling the entire cable out from the conduit in order to effect a repair.

My invention, therefore, provides a construction which insures that in case the separator insulation breaks down at any point other than the point of fault, such break down will occur at some readily-accessible point.

It is desirable to use a separator insulation of such a nature and thickness as will be readily weakened dielectrically by the heat due to the arcing at a fault, and while any insulation having this feature may be used I find that insulation made of varnished cotton or similar fabric will meet all these requirements.

I claim:

1. A conductor comprising a pair of conductor members or leads and insulating means between said members which is commensurate with the normal operating voltage employed between said members when they are connected in parallel in an electrical-distributing system, said insulating means being weaker at predetermined points along the length of the conductor whereby when a fault occurs that develops unsafe voltage between said members the insulation will give way at the predetermined point.

2. A conductor comprising a pair of conductor members and insulating means between said conductor members for insulating one from the other, which means has at predetermined points a less dielectric strength than at other points.

3. A conductor comprising a pair of parallel-connected leads separated by insulation commensurate at all points with the normal working voltage between said leads, said insulation at predetermined points having a less dielectric strength than the normal strength throughout the body of the insulation.

4. A conductor comprising a pair of parallel-connected leads separated by insulation commensurate at all points with the normal working voltage between said leads, said insulation having the characteristic of being readily weakened dielectrically by the heat due to an arc resulting from a fault and at predetermined points having a less dielectric strength than the normal strength throughout the body of the insulation.

In testimony whereof, I have signed my name to this specification, in the presence of two subscribing witnesses.

WILLIAM H. COLE.

Witnesses:
BERTHA F. HEUSER,
THOMAS J. DRUMMOND.

Copies of this patent may be obtained for five cents each, by addressing the "Commissioner of Patents, Washington, D. C."